United States Patent
Apfel et al.

[15] 3,682,528
[45] Aug. 8, 1972

[54] INFRA-RED INTERFERENCE FILTER

[72] Inventors: Joseph H. Apfel, Santa Rosa; Robert M. Gelber, Rohnert Park, both of Calif.

[73] Assignee: Optical Coating Laboratory, Inc., Santa Rosa, Calif.

[22] Filed: Sept. 10, 1970

[21] Appl. No.: 71,009

[52] U.S. Cl. .....................350/1, 117/33.3, 350/166
[51] Int. Cl. ................................................G02b 5/28
[58] Field of Search..........................350/1, 163–166; 117/33.3

[56] References Cited

UNITED STATES PATENTS

| | | |
|---|---|---|
| 2,676,117 | 4/1954 | Colbert et al. .......350/164 UX |
| 3,290,203 | 12/1966 | Antonson et al........350/1 UX |
| 2,854,349 | 9/1958 | Dreyfus et al.............350/1 X |

FOREIGN PATENTS OR APPLICATIONS

| | | |
|---|---|---|
| 966,705 | 3/1950 | France......................350/166 |

*Primary Examiner*—David Schonberg
*Assistant Examiner*—Toby H. Kusmer
*Attorney*—Flehr, Hohbach, Test, Albritton & Herbert

[57] ABSTRACT

Infra-red reflecting interference filter having a substrate capable of transmitting visible energy and having a surface with a precoat layer adherent thereto formed of a thin layer of material and a layer of silver deposited on the thin layer and having a thickness so that it is highly transmitting of visible energy and highly reflecting of infra-red energy.

7 Claims, 4 Drawing Figures

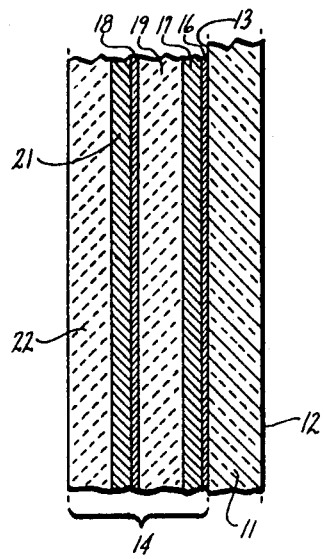
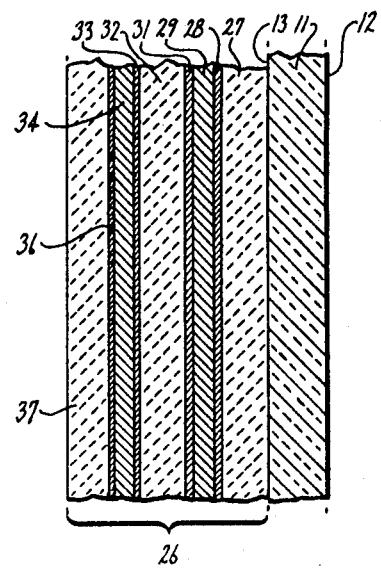
Fig. 1
Fig. 3
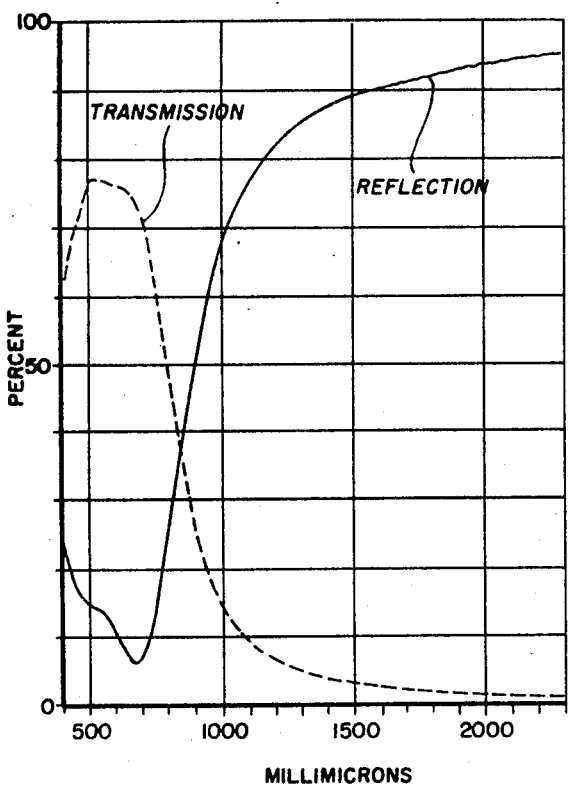
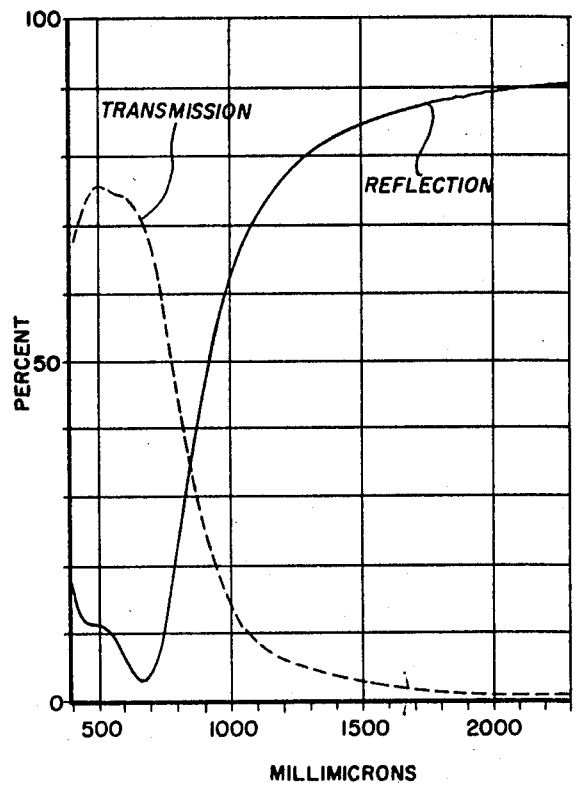
Fig. 2
Fig. 4
INVENTORS
Joseph H. Apfel
BY  Robert M. Gelber
Attorneys

INFRA-RED INTERFERENCE FILTER

BACKGROUND OF THE INVENTION

1. Field of the Invention

This invention relates to infra-red reflecting interference filters utilizing thin films.

2. Description of the Prior Art

Optical interference filters have heretofore been provided which were comprised of two equal metal layers separated by a single non-absorbing layer and having the property of transmitting energy of one wavelength predominantly. Such filters are commonly known as Fabry Perot filters and are often used to isolate single narrow wavelength bands. For visible energy, it has been the practice to utilize silver metal films with magnesium fluoride or cryolite spacer layers. Typically, the silver metal films are several hundred Angstroms in thickness and the dielectric layer is adjusted to cause the peak transmission of the filter to occur at the desired wavelength. Increasing the thickness of the silver layers tends to make the filter transmit a narrow wavelength band at a lower level of transmission. In the design of such filters, it has been possible to theoretically calculate the curves of reflection and transmission utilizing the optical constants provided in the literature for silver. In the subsequent fabrication of such filters it has been found that actual optical characteristics of the filters agree relatively well with the calculated optical characteristics when the thickness of the silver layer is generally greater than 200 angstroms. However, it has been found that when the silver layers have a thickness which is significantly less than 200 angstroms as, for example, less than 100 angstroms, the optical characteristics do not agree with the theoretical characteristics. This has been explained that very thin metal films are characterized by agglomerates of metal particles rather than homogeneous metal slabs. It is for this reason that the character of actual filters which include thin metal films often differ from the simple theoretical prediction. In the past when attempts have been made to provide silver layers which have a thickness which is less than 130 angstroms in physical thickness, it has been found that the silver layer becomes very uncontrollable and, in general, is not repeatable. In addition, it has been found that the optical constants change so that the results are in no way similar to the results which are obtained when the silver layer is sufficiently thick so that it is opaque. There is, therefore, a need for a filter construction in which it is possible to utilize thin silver layers having a thickness less than 130 angstroms.

SUMMARY OF THE INVENTION AND OBJECTS

The infra-red reflecting interference filter consists of a substrate having a surface. The substrate is formed of a material which is capable of transmitting visible energy with high efficiency. A very thin layer of material is adherent to the surface and a layer of silver is deposited on the thin layer. The layer of silver is of a thickness so that it is capable of highly transmitting visible energy while still being capable of reflecting infra-red energy.

In general, it is an object of the present invention to provide an infra-red reflecting interference filter which is capable of reflecting infra-red energy while transmitting visible energy.

Another object of the invention is to provide a filter of the above character which utilizes a thin layer of silver preferably below 130 angstroms in thickness.

Another object of the invention is to provide a filter of the above character which utilizes a thin precoat or underlayer.

Another object of the invention is to provide a filter of the above character in which the thin underlayer affects the optical characteristics of the silver layer.

Another object of the invention is to provide a filter of the above character in which two or more dielectric layers can be utilized.

Another object of the invention is to provide a filter of the above character in which additional silver layers can be utilized.

Another object of the invention is to provide a filter of the above character which can be handled and washed without special precaution.

Another object of the invention is to provide a filter of the above character which can pass humidity and abrasion tests.

Another object of the invention is to provide a filter of the above character which can be relatively economically produced.

Additional objects and features of the invention will appear from the following description in which the preferred embodiments are set forth in detail in conjunction with the accompanying drawing.

BRIEF DESCRIPTION OF THE DRAWINGS

FIG. 1 is an enlarged cross-sectional view of a filter incorporating the present invention.

FIG. 2 is a graph showing transmittance and reflectance curves which can be obtained from a filter of the type shown in FIG. 1.

FIG. 3 is an enlarged cross-sectional view of another filter incorporating the present invention and having nine layers rather than six layers as in the embodiment shown in FIG. 1.

FIG. 4 is a graph showing transmittance and reflectance curves giving the results of a filter of the type shown in FIG. 3.

DESCRIPTION OF THE PREFERRED EMBODIMENTS

An interference filter incorporating the present invention is shown in FIG. 1. As shown therein, it consists of a substrate 11 which is provided with two planar parallel surfaces 12 and 13 in which the surface 12 is exposed to the medium and surface 13 has an optical coating 14 disposed thereon. The substrate can be formed of any suitable material; however, in the present application, it is desirable that the substrate be formed of a material which is highly transmitting in the visible region of the spectrum. Thus, for example, the substrate 11 can be formed of glass having an index of refraction of approximately 1.5.

The coating 14 is formed of at least two layers, one layer 16 which is adherent to the surface 13 serves as a substructure or precoat layer and a silver layer 17 which is deposited on the layer 16. The precoat layer 16 is preferably maintained as thin as possible so that it will have very little, if any, effect upon the optical characteristics of the substrate 11 or the silver layer 17. Thus, it has been found that the layers 16 preferably have a thickness ranging from 5 to 20 angstroms. This thin layer 16 can be formed of any one of a number of materials. It has been found that nickel and chromium are particularly satisfactory. Other metals which also can be utilized are rhodium, paladium, Nichrome, tungsten, etc. In addition, it has been found that certain dielectric materials such as titanium monoxide, silicon monoxide and aluminum oxide, and metal oxide mixtures such as those disclosed in U. S. Pat. No. 3,034,924 also can be utilized to provide a satisfactory substructure or precoat for the silver layer 17.

The thickness of this precoat or substructure layer is not critical providing it exceeds a certain minimum value which is believed to be approximately 5 angstroms. The effect of this precoat or substructure appears to be that of a "nucleation" layer. Thus, this substructure or precoat layer is to thin so as to be ineffective in changing the optical properties of the filter but causes the subsequent silver film to behave as if it were a homogeneous metal slab.

The thin layer 16 and the silver layer 17 are deposited in a vacuum chamber. The material such as nickel which is utilized for making the thin layer is evaporated in the chamber. Before commencement of the evaporation of the nickel for the thin layer, it is assumed that the substrate or chip which is to be coated has a transmission efficiency for visible energy of substantially 100 percent. The nickel is deposited until the transmission drops by approximately 2 percent. This dropping of the transmission indicates that a thin layer of metal has been deposited upon the surface 13 but which is insufficient to appreciably affect the transmission qualities of the filter. Thereafter, silver is evaporated and the transmission is again monitored until it decreases from approximately 98 percent down to 80 percent. It has been found that when the transmission has been decreased to this extent that the silver layer in combination with the nickel layer have a combined physical thickness of approximately 70 angstroms. Typically, the thickness of the thin nickel layer may range between 10 and 25 angstroms and the thickness of the silver layer may range between 55 and 60 angstroms. However, as pointed out above, satisfactory results can still be obtained utilizing a range for the thin layer 16 ranging from 5 to 20 angstroms and a range from 55 to 130 angstroms for the silver layer. The nickel-silver layers 16 and 17 can be considered to constitute a bi-layer having a combined thickness ranging from 60–130 angstroms.

It has been found that in addition to affecting the optical properties of the silver layer, the substructure or precoat layer is very effective in improving the physical characteristics of the silver film or layer 17.

It also has been found that if a three-layer sandwich, i.e., a tri-layer is used, the durability of the coating is improved over the bi-layer. Thus, there can be provided an additional thin layer (not shown) which is deposited on the layer 17 and which preferably is formed of the same material and thickness as the layer 16.

In the filter shown in FIG. 1, dielectric layers have been utilized to control the width and shape of the transmission passband for the filter and in conjunction with the silver layer to control the slope of the cut-off.

In the arrangement shown in FIG. 1, a thin layer 18 has been provided but a dielectric layer 19 has been deposited directly on the silver layer 17 and the thin layer 18 is deposited on the layer 19. The dielectric layer can be formed of any suitable material such as aluminum oxide, magnesium fluoride for low index materials, and titanium dioxide for a high index material. It has been found that the index of refraction of the dielectric layer has very little effect upon the performance of the filter. When a low index dielectric layer is utilized, the effect is to make the passband in the visible slightly narrower. When a dielectric layer utilizing high index material is utilized, the passband becomes wider.

Another silver layer 21 is deposited upon the thin layer 18 in the same manner as the layer 17. Thereafter, an additional dielectric layer 22 is deposited upon the silver layer 21. It has its outer surface exposed to the medium which has an index of refraction of 1.0.

From the filter shown in FIG. 1, it can be seen that two or more dielectric layers can be utilized with two silver layers and with each silver layer having a precoat and a postcoat layer. The dielectric layer 19 can have a quarter-wave optical thickness equal to one and one-half times the wavelength in the region of the passband. The dielectric layer 22 can have a quarter-wave optical thickness equal to one-half the wavelength in the passband. These thicknesses may be changed by amounts up to 50 percent to change the shape of the passband.

In summary, the dielectric layers control the width and shape of the transmission passband and in conjunction with the silver layer the slope of the cut-off. The silver layers give infra-red reflectance and thus heat rejection. The metal precoat acts as a nucleation layer to enable repeatable fabrication of the thin silver layers. The metal precoat layer also acts as a glue or adhesion layer between silver and the adjacent dielectric layer and, in addition, improves the durability of the silver layer. The post-coat layer functions similarly as a glue layer and also improves durability of the coating on the other side of the silver layer.

The dielectric material utilized in the filter can be changed without a major change appearing in the spectral performance of the filter. Although the actual design must be reoptimized, in general a lower index dielectric gives a sharper cut-off and narrower transmission passband. A high index material gives a wider, flatter passband and a more gradual cut-off.

In the application of the silver layers, it has been found that it is desirable to put the silver layers in place with the substrate at room or slightly elevated temperature. Temperatures up to 60° C. have been found satisfactory. It has been found that the silver layer when deposited in very thin layers is more durable than opaque layers.

In making a coating of the type shown in FIG. 1, it was found that the total dielectric coating time was approximately 6 minutes, whereas the metal coating time was approximately 1 minute. It was found that the coating passed the humidity test of MIL–C–675A in which the coating was found to be unaltered after exposure for 24 hours to a 95 percent relative humidity environment at a temperature of 120° F. It was also found that the coating was unaltered by a 50-stroke abrasion test according to MIL–M–13,508B in which the surface of the coating is rubbed by a small pad of cheesecloth loaded with a one-pound weight. It was found that the coating could be handled and washed without special precautions.

A filter constructed in accordance with FIG. 1 is set forth below:

| Layer | INDEX OF MEDIUM Index or Material | 1.00 Thickness In Millimicrons | Qwot |
|---|---|---|---|
| 22 | 1.67 | 50.3 | 336.0 |
| 21 | Silver | 7.0 | |
| 18 | Nickel | 0.5 | |
| 19 | 1.67 | 114.0 | 761.5 |
| 17 | Silver | 7.0 | |
| 16 | Nickel | 0.5 | |
| INDEX OF SUBSTRATE | | 1.52 | |
| QWOT - Quarter Wave Optical Thickness | | | |

A graph showing the results which can be obtained with such a filter constructed in accordance with FIG. 1 is shown in FIG. 2. As can be seen from this curve, transmission and reflection are both plotted. The transmission is very high from 400 to 700 millimicrons, the visible region, and the transmission is over 70 percent. In fact, it is approximately 72 percent. The reflection in the visible region between 400 and 700 millimicrons is approximately 10 percent average reflection. It can be seen as soon as the curves move into the infra-red region the transmission drops off very sharply so the average transmission between 700 and 2500 millimicrons is approximately 8 percent so that the heat is reflected or rejected and is not transmitted. Similarly, the reflection greatly increases and goes way up in the infra-red so that most of the heat is reflected. In other words, it can be seen that the filter transmits light and reflects heat.

From the construction shown in FIG. 1 it can be seen that the design therein contains four spectral layers plus a thin precoat layer of nickel for each silver layer. The filter had a neutral appearance in both directions.

If it is necessary to have a more durable coating, a coating 26 of the type shown in FIG. 3 can be utilized. The coating 26 consists of nine layers with layers 27, 32 and 37 being dielectric layers, layers 29 and 34 silver layers, and with layers 28, 31, 33 and 36 being nickel layers. It can be seen that the design shown in FIG. 3 is very similar to that shown in FIG. 1. Two silver layers are utilized and a precoat nickel layer is provided for each of the silver layers. In addition, there has been provided a post-coat nickel layer for each of the silver layers, the post-coat layers being identified as layers 31 and 36. In addition, there has been provided an additional dielectric layer 27 which is provided for bonding the first nickel-silver-nickel tri-layer to the surface of surface 13 of the substrate 11. As explained previously, various dielectric materials can be utilized. However, aluminum oxide ($Al_2O_3$) has been found to be very satisfactory. The nickel layers can be formed of other materials as hereinbefore described and can have the same thickness as hereinbefore described. The silver layers can have the thicknesses described in conjunction with the embodiment shown in FIG. 1. It has been found that it is possible to eliminate the first dielectric layer 27 and to substitute therefor a double thickness of the first nickel layer 28. It has been found that this double thickness nickel layer will be strong enough to hold the coating to the substrate so that the coating will pass relatively strenuous durability requirements. However, it is preferable to utilize an aluminum oxide layer rather than doubling the first nickel layer because the nickel layer decreases the transmittance several percent and because the aluminum oxide gives it greater resistance to deterioration from operation at high temperatures. The dielectric layers can have the thicknesses herein described in conjunction with FIG. 1.

It also has been found that the coating shown in FIG. 3 will pass a 24 hour humidity test, a tape test and a standard 20-rub eraser test according to MIL-C-675A. The maximum temperature for continuous operation of this coating is 275° C. It also was found that this coating can be taken to 350° C. for two hours and 500° C. for half an hour with no degradation in the coating. In fact, it was found that the bake improved the filter because the visual transmission increased by several percent without changing the infra-red rejection of the filter.

A filter constructed in accordance with FIG. 3 is set forth below:

| Layer | INDEX OF MEDIUM Index or Material | 1.00 Thickness in Millimicrons | Qwot |
|---|---|---|---|
| 37 | 1.67 | 50.3 | 336.0 |
| 36 | Nickel | 0.5 | |
| 34 | Silver | 7.0 | |
| 33 | Nickel | 0.5 | |
| 32 | 1.67 | 114.0 | 761.5 |
| 31 | Nickel | 0.5 | |
| 29 | Silver | 7.0 | |
| 28 | Nickel | 0.5 | |
| 27 | 1.67 | 50.0 | 334.0 |
| INDEX OF SUBstrate | | 1.52 | |

The transmittance and reflectance for such a filter are shown in FIG. 4. It can be seen that the characteristics of the filter with respect to transmittance and reflection are very similar to the filter shown in FIG. 1.

In comparing the six layer design shown in FIG. 1 with the nine layer design shown in FIG. 3, it has been found that the nine layer design is substantially superior from a durability standpoint. It has been found that in a humid atmosphere the six layer design may occasionally develop a small blemish or spot at the edge. The nine layer design does not show this. After a 2 hour bake at 350° C., it was found that the six layer design will have scatter centers and be visibly degraded while the nine layer design remains clear. The nine layer design passes the cellophane tape adhesion and the standard abrasion test while the six layer design will not pass these two tests. The six layer design has the additional advantage in that it has fewer layers and, therefore, is simpler to fabricate.

From the foregoing it can be seen that there has been provided a new interference filter which has outstanding characteristics. In particular, it will transmit the visual while at the same time reflecting substantially all of the infrared energy from a source. Thus, in effect, the article can be called a hot mirror because it reflects what is hot. It is readily apparent that there are many applications for such a filter. For example, it can be utilized in movie projectors where it is desired to protect a film or slide from heat. The filter can also be utilized in conjunction with overhead projectors and other types of projectors in which it is desirable to keep the heat of the light source from the article being viewed.

We claim

1. In a filter, a substrate having a surface, said substrate being formed of a material capable of transmitting visible energy and a coating formed on said surface, said coating comprising first and second bi-layers, with each of the said bi-layers consisting of a layer of silver having a thickness ranging from 55 to 130 angstroms and a precoat layer having a thickness which is in excess of a minimum value of approximately 5 Angstroms and has a maximum thickness which is ineffective in changing the optical properties of the filter but causing the silver layer to behave as a homogenous metal slab, said coating having a transmission which is over approximately 70 percent in the region from 400 to 700 mm and below approximately 10 percent in the region of 700 to 2500 mm and a reflection which is approximately 10 percent average from 400 to 700 mm and increases to over 90 percent in the range of 700 to 2500 mm.

2. A filter as in claim 19 wherein each of said precoat layers has a thickness ranging from 5 to 20 angstroms.

3. A filter as in claim 2 wherein each of said precoat layers is formed of a metal.

4. A filter as in claim 3 wherein each of said precoat layers is formed of nickel.

5. A filter as in claim 1 wherein said coating includes at least one layer of dielectrical material overlying said surface.

6. A filter as in claim 1 wherein said coating includes an additional dielectric layer overlying each bi-layer.

7. A filter as in claim 1 which has a neutral appearance in both directions.

* * * * *

PO-1050
(5/69)

UNITED STATES PATENT OFFICE
CERTIFICATE OF CORRECTION

Patent No. 3,682,528          Dated August 8, 1972

Inventor(s) Joseph H. Apfel and Robert M. Gelber

It is certified that error appears in the above-identified patent and that said Letters Patent are hereby corrected as shown below:

| | |
|---|---|
| Claim 1, Col. 7, lines 9 & 10 | insert after "ineffective" --by itself-- |
| Claim 1, Col. 7, line 12 | Change "coating" to "filter" |
| Claim 1, Col. 7, line 14 | Change "mm" to "millimicrons" |
| Claim 1, Col. 7, line 15 | Change "mm" to "millimicrons" |
| Claim 1, Col. 7, line 16 | Change "mm" to "millimicrons" |
| Claim 1, Col. 8, line 2 | Change "mm" to "millimicrons" |
| Claim 2, Col. 8, line 3 | Change "19" to "1". |

Signed and sealed this 27th day of November 1973.

(SEAL)
Attest:

EDWARD M. FLETCHER, JR.
Attesting Officer

RENE D. TEGTMEYER
Acting Commissioner of Patents